Oct. 29, 1929.　　W. H. WYMAN　　1,733,290
TRANSMISSION GEARING
Filed June 12, 1926　　4 Sheets-Sheet 1
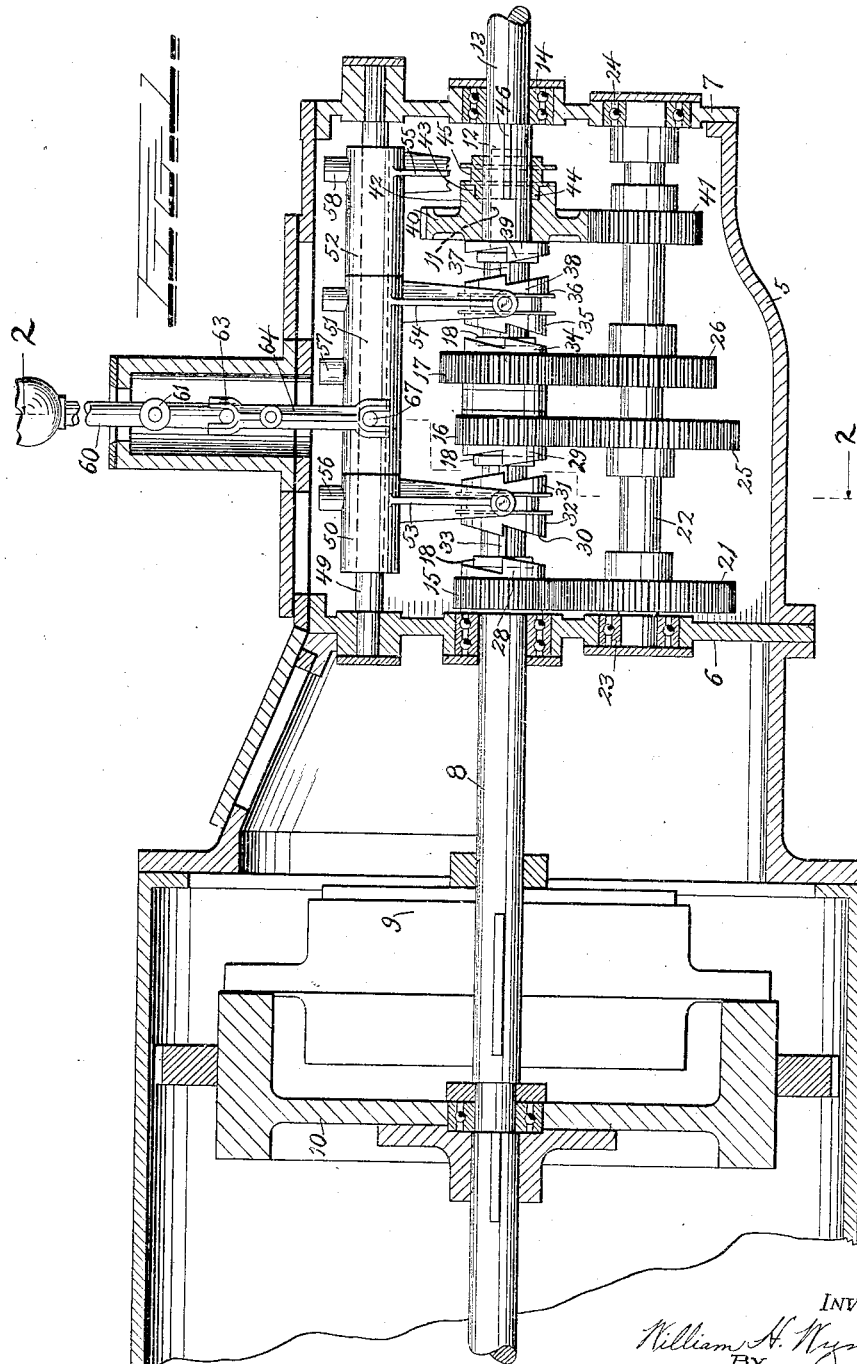
INVENTOR
William H. Wyman.
BY
Morsell, Keeney & Morsell.
ATTORNEYS

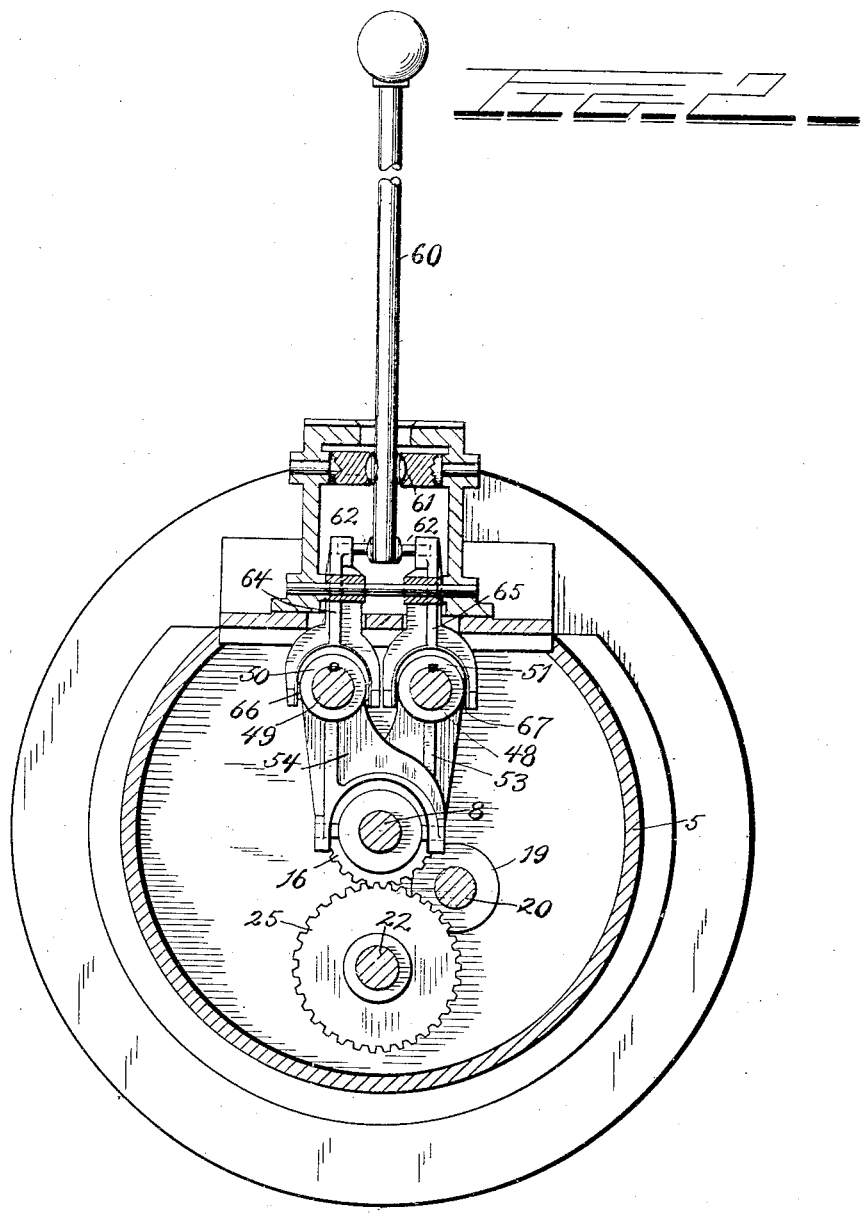

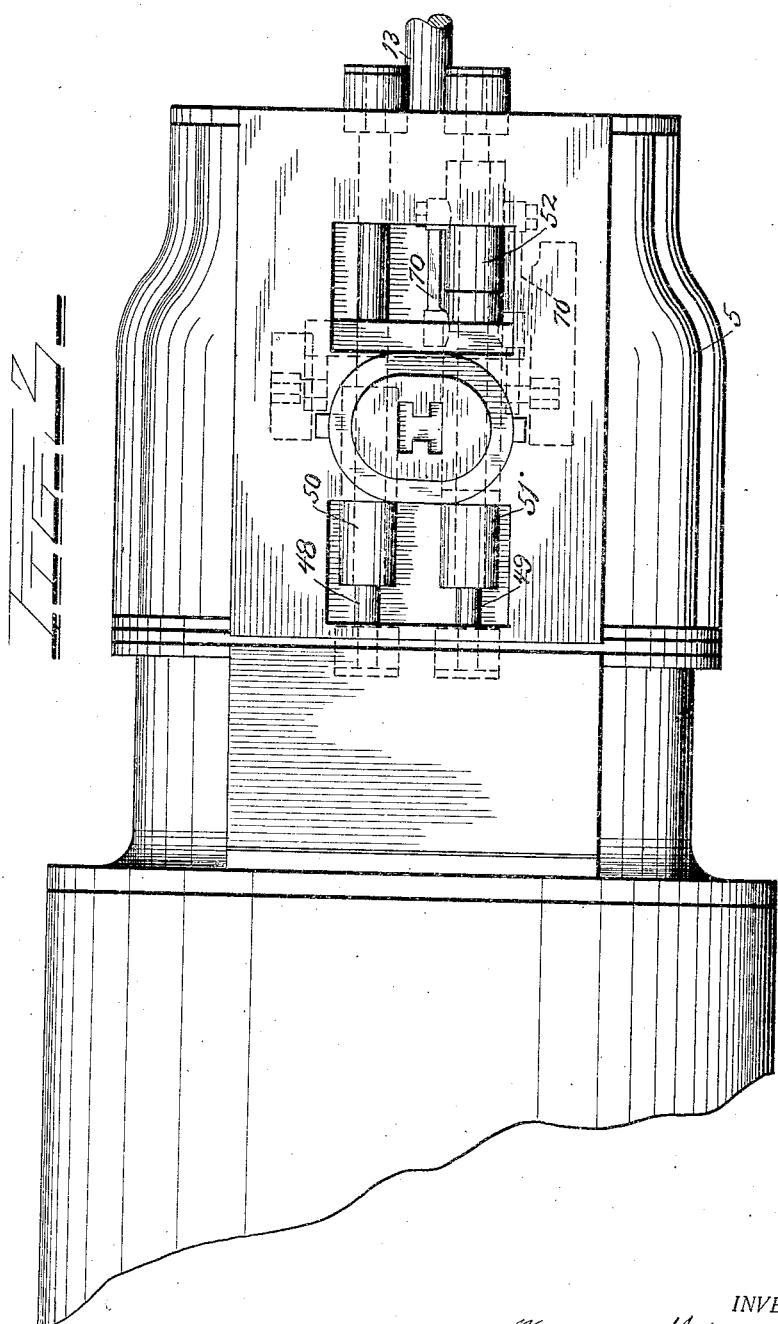

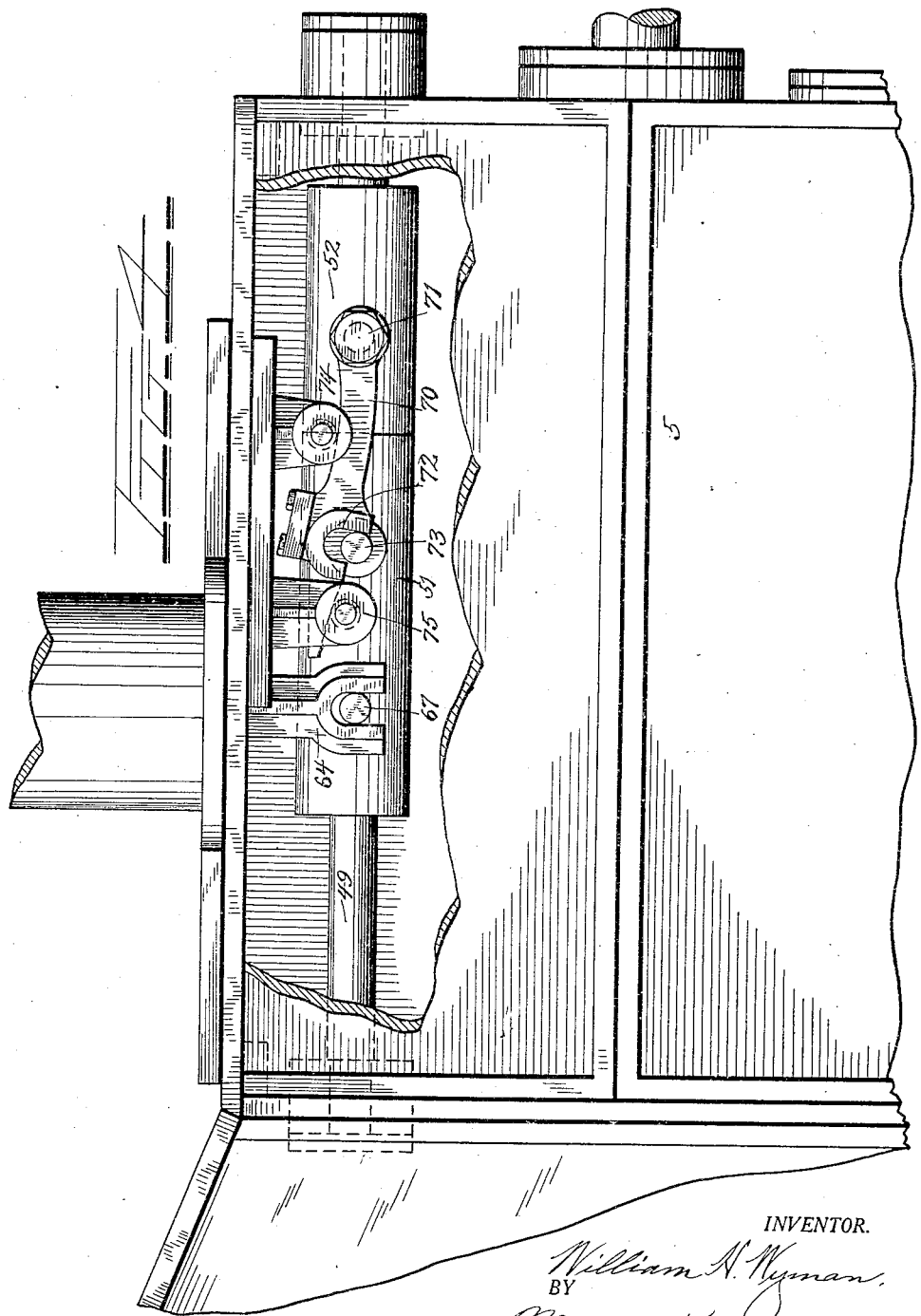

Patented Oct. 29, 1929

1,733,290

UNITED STATES PATENT OFFICE

WILLIAM H. WYMAN, OF OSHKOSH, WISCONSIN; EMMA WYMAN, EXECUTRIX OF SAID WILLIAM H. WYMAN, DECEASED, ASSIGNOR OF ONE-HALF TO PINE-IHRIG MACHINE CO., OF OSHKOSH, WISCONSIN, A CORPORATION OF WISCONSIN

TRANSMISSION GEARING

Application filed June 12, 1926. Serial No. 115,539.

This invention relates to transmission gearing and more especially to an automobile transmission and has for one of its objects to provide a change speed gearing similar to the well known sliding gear transmission but in which the various gears are constantly in mesh and are provided with suitable clutches for selecting the particular set of gears to produce the speed desired.

A further object of the invention is to provide a transmission of the class described having a plurality of one way clutches for transmitting motion from the drive shaft to the gears and in which the final drive or high gear is a direct drive from the drive shaft to the driven shaft.

A still further object of the invention is to provide a transmission of the character described in which the jack or counter shaft together with all of the gears are idle and do not rotate when the drive is direct or in high gear.

A still further object of the invention is to provide a transmission of the class described which will be simple in construction, comparatively inexpensive to manufacture and more efficient in use than those which have been heretofore proposed.

With the above and other objects in view which will appear as the description proceeds, the invention consists in the novel details of construction and combinations of parts more fully hereinafter described and particularly pointed out in the appended claims.

Referring to the accompanying drawings in which like reference characters designate like parts in all the views:

Figure 1 is a central vertical sectional view partly in elevation of a change speed transmission gear constructed in accordance with the present invention;

Fig. 2 is a transverse sectional view of the parts shown in Fig. 1, taken approximately on the plane indicated by the line 2—2 of said figure;

Fig. 3 is a top plan view of the transmission gear shown in Fig. 1, the gear shifting lever being omitted; and, Fig. 4 is a side elevational view partly broken away of the transmission and showing the mechanism employed for positively shifting one of the clutch members into and out of engagement when the transmission is shifted to and from high speed.

Referring more particularly to the said drawings, 5 indicates a suitable housing for the transmission gearing, provided with the end plates or heads 6 and 7, in the former of which is suitably journalled the drive shaft 8 leading from the usual clutch 9 associated with the fly-wheel 10 of the motor not shown. The said main or drive shaft 8 extends a considerable distance within the casing or housing 5 and is provided with a reduced end 11, which is journalled within a bore 12 provided in the end of the driven shaft 13 which is journalled in suitable bearings 14 in the end plate or head 7, as will be clear from Fig. 1.

Journalled upon the drive shaft 8 are the gears 15, 16 and 17, which gears are free to rotate upon the said shaft but are held against lateral movement thereon, in any suitable manner as for example, by means of collars 18. The said gear 15 meshes with a gear 19, (see Fig. 2), journalled upon a pin or stud 20 carried by the end plate 6 and the said gear 19 in turn meshes with a gear 21 which is keyed upon and rigid with the counter or jack shaft 22, which shaft is journalled in suitable bearings 23 and 24 carried by the end plates or heads 6 and 7, respectively.

The gears 16 and 17 mesh respectively with gears 25 and 26 which are likewise rigid with the jack shaft 22, and as will be readily understood, constitute the low and intermediate drives of the transmission. The gears 15, 19 and 21 as will also be readily understood, constitute the reverse drive.

The gears 15 and 16, are respectively provided with one way toothed clutch members 28 and 29 which are adapted to co-act respectively with the companion clutch members 30 and 31, of a clutch collar 32 which is splined upon the drive shaft 8 by means of a key or keys 33.

In like manner the gear 17 is provided with a clutch member 34 which is adapted to co-act with a companion clutch member 35 carried by a clutch collar 36 splined upon the drive shaft 8 by the key 37. The said clutch collar 36 also has a second clutch member 38 which is adapted to co-act with a companion clutch member 39 formed upon the inner end of the driven shaft 13, (see Fig. 1).

Rotatably journalled upon the said inner end of the shaft 13 is a gear 40, the said gear being freely rotatably upon the said shaft and meshing with a companion gear 41 rigid with the jack shaft 22. The said gear 40 is provided with a hub 42 in which is formed a clutch member 43 adapted to be engaged by a companion clutch member 44, carried by a clutch collar 45 which is splined upon the inner end of the driven shaft 13 by means of the key 46.

Mounted within the casing or housing 5 above the main shaft 8 and the gears carried thereby is a pair of longitudinally extending rods or shafts 48 and 49 upon the former of which is slidably mounted a clutch member actuating sleeve 50 while upon the latter of which is mounted a pair of clutch actuating sleeves 51 and 52. The sleeve 50 is provided with a downwardly extending yoke 53 which engages the clutch collar 32 whereby the latter may be shifted longitudinally upon the shaft 8 to bring its clutch members 30 and 31 into and out of engagement with their companion clutch members 28 and 29 at will. In like manner, the sleeve 51 is provided with the downwardly extending yoke 54 engaging the clutch collar 36 and the sleeve 52 is provided with a yoke 55 engaging the clutch collar 45.

The sleeves 50, 51 and 52 provided with suitable housings 56, 57 and 58 respectively for enclosing the well known spring pressed detent for holding the sleeves in set positions and the said sleeves 50 and 51 may be readily shifted longitudinally upon their respective rods 48 and 49 by the usual selective gear shifting lever 60 mounted as at 61 for lateral as well as for forward and backward movement whereby the pins 62 carried by the lower end of the said lever may be caused to engage and disengage the bifurcated upper end 63 of the shifting levers 64 and 65 respectively, which levers in turn engage the studs or pins 66, and 67 carried by the sleeves 50 and 51.

From what has been thus far disclosed, it will be readily apparent that the transmission will operate as follows:

Suppose for example, it is desired to shift the mechanism into low gear, through the gear shifting lever 60, the sleeve 50 will be moved toward the right as viewed in Fig. 1 to bring the clutch members 31 and 29 into engagement whereupon motion from the drive shaft 8 will be transmitted through the clutch collar 32 to the gear 16 then to the gear 25, jack shaft 22, gear 41, gear 40 and clutch members 43 and 44 to the clutch collar 45 and to the driven shaft 13. During such operation, of course, the various gears 15, 19, 21, 17 and 26 will all be rotated inasmuch as the gears 21, 25, 26 and 41 are all fast to the jack shaft whereas the gears 15 and 17 are loose upon the main shaft.

The drives for reverse and intermediate gear are secured in like manner and it is not thought necessary to describe them in detail. In the high or direct drive, however, when the sleeve 51 is shifted to the right as viewed in Fig. 1, by means of the gear shifting lever 60 to move its clutch collar 36 so as to bring the clutch members 38 and 39 into engagement, there will be a direct drive from the shaft 8 to the shaft 13 inasmuch as the clutch member 38 is keyed to the shaft 8 while the clutch member 39 is rigid with the driven shaft 13. When the parts are in this position it is desirable to disengage the various gears within the transmission in order to relieve the motor of the necessity of turning all of said gears idly in the transmission lubricant and to this end the clutch collar 45 is also shifted to the right as viewed in Fig. 1, through the medium of its yoke 55 and sleeve 52 to disengage the clutch members 43 and 44, whereby the gear 40 is left free of the driven shaft.

The right hand movement of the sleeve 52 is readily accomplished through the engagement therewith of the sleeve 51, the said sleeves being mounted end to end upon the said rod 49. When, however, it is desired to disengage the direct drive upon movement of the sleeve 51 toward the left as viewed in Fig. 1, some means must be provided for returning the sleeve 52 so as to reengage the clutch members 43 and 44.

The particular means employed for this purpose is illustrated in Fig. 4 and comprises a pair of links 70, only one of which is shown in the said figure, which are pivoted at one end as at 71 to the sleeve 52 and are provided at their other ends with the open slots or recesses 72 adapted to engage the pins or studs 73 carried by the sleeve 51. Suitable rollers 74 and 75 are supported from the casing or housing 5 and engage the said links 70 substantially as shown to cause the said links at the proper time to engage and disengage the pins 73 carried by the sleeve 52 whereby the said sleeve may be shifted from the neutral position as shown in Fig. 1, toward the left as viewed in said figure, to bring the clutch members 34 and 35 into engagement to secure the intermediate gear ratio.

It will thus be seen that the present invention provides a change speed transmission in which the gears themselves are constantly in mesh and are provided with suitable one-way clutches whereby the different speed ratios may be obtained and that upon the similar or high speed there is a direct drive between the drive and driven shafts with the counter or jack shaft and all of the various gears remaining stationary.

While one form of the invention has been illustrated, it is obvious that those skilled in the art may vary the details of construction as well as the precise arrangements of parts without departing from the spirit of the invention and it is, therefore, not wished to be limited to the above disclosure except as may be required by the claim.

What is claimed is:

In a transmission gearing of the class described, a drive shaft, a driven shaft and a counter shaft; a plurality of sets of gear connections between said drive and counter shafts; clutch members for selectively engaging and disengaging the drive shaft gears to and from said shaft; means for shifting certain of said clutch members; a clutch member rigid with said driven shaft adapted to coact with one of said first named clutch members to produce a direct drive from said drive to said driven shaft; a gear connection between said counter and driven shafts, the gear upon said driven shaft being freely rotatable thereon; clutch means for engaging and disengaging said last named gear with said driven shaft; means for shifting said last named clutch means; a latch link pivotally carried by said last named shifting means; a pin carried by the shifting means for the direct drive clutch; and means for causing said link to engage and disengage said pin to couple and uncouple said two last named shifting means upon certain predetermined movements thereof.

In testimony whereof, I affix my signature.

WILLIAM H. WYMAN.